USo05159811A

United States Patent [19]
Hefler et al.

[11] Patent Number: 5,159,811
[45] Date of Patent: Nov. 3, 1992

[54] FLEXIBLE COUPLING DEVICE FOR USE IN AN ENGINE MANIFOLD SYSTEM

[75] Inventors: Gregory W. Hefler, Dunlap; Michael J. Evancik, Chillicothe, both of Ill.

[73] Assignee: Caterpillar Inc., Peoria, Ill.

[21] Appl. No.: 552,976

[22] Filed: Jul. 16, 1990

[51] Int. Cl.⁵ .............................................. F01N 7/00
[52] U.S. Cl. ...................................... 60/322; 60/323; 285/187; 285/226
[58] Field of Search ................ 60/322, 323; 285/187, 285/226

[56] References Cited

U.S. PATENT DOCUMENTS

| | | |
|---|---|---|
| 1,505,121 | 8/1924 | Allport . |
| 1,726,483 | 8/1929 | Giesler . |
| 2,485,370 | 10/1949 | Dreyer ................... 285/162 |
| 3,177,649 | 4/1965 | Tromel .................. 60/322 |
| 3,490,794 | 1/1970 | Swanson ................ 285/226 |
| 3,820,829 | 6/1974 | Hasselbacher et al. ........ 285/226 |
| 4,106,798 | 8/1978 | Haug ...................... 285/226 |
| 4,186,949 | 2/1980 | Bartha ..................... 285/226 |
| 4,475,341 | 10/1984 | Inoue et al. ................. 60/605 |

FOREIGN PATENT DOCUMENTS 3121341 12/1982 Fed. Rep. of Germany ........ 60/322
2369497 5/1978 France ................. 285/226

OTHER PUBLICATIONS

Engine Manifold-Exhibit "A", Caterpillar Inc.-3612 Cast Manifold.
Engine Manifold-Exhibit "B", Caterpillar Inc.-3608 Cast Manifold.

Primary Examiner—Douglas Hart
Attorney, Agent, or Firm—Kenneth A. 3loads

[57] ABSTRACT

A flexible coupling device for sealably connecting together first and second tubular bodies which are subjected to pulsing pressures and to thermal expansion and contraction. The first tubular body includes a first tubular portion having a cylindrical end and a flange and the second tubular body includes a second tubular portion having a planar mounting surface. The flexible coupling device includes a guide ring disposed in telescopic relation with the cylindrical end of the first tubular body, a flexible bellows having first and second attachment ends, a first retaining ring for releasably securing the first attachment end of the flexible bellows to the flange and a second retaining ring for releasably securing the second attachment end and the guide ring to the planar mounting surface of the second tubular portion.

19 Claims, 3 Drawing Sheets

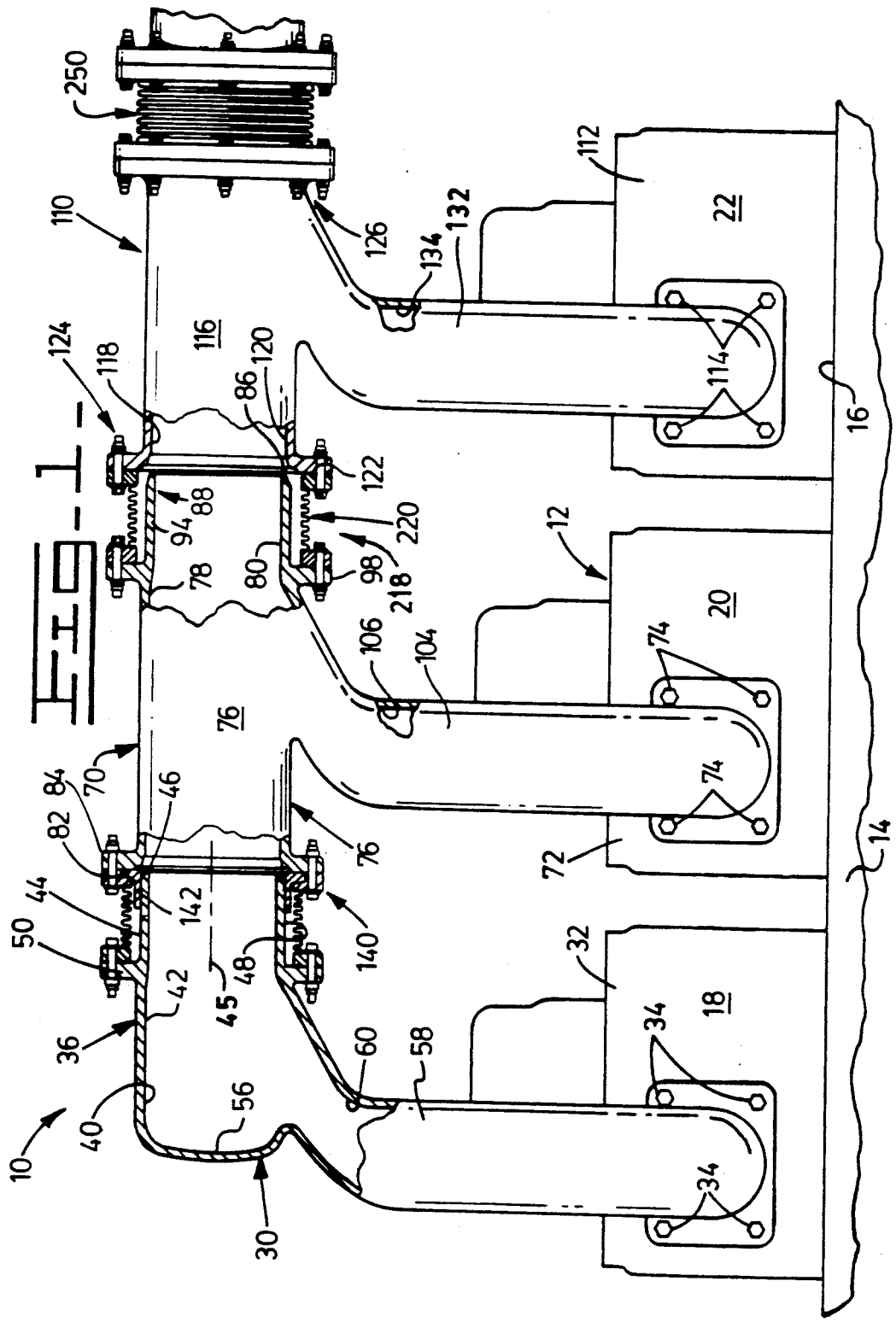

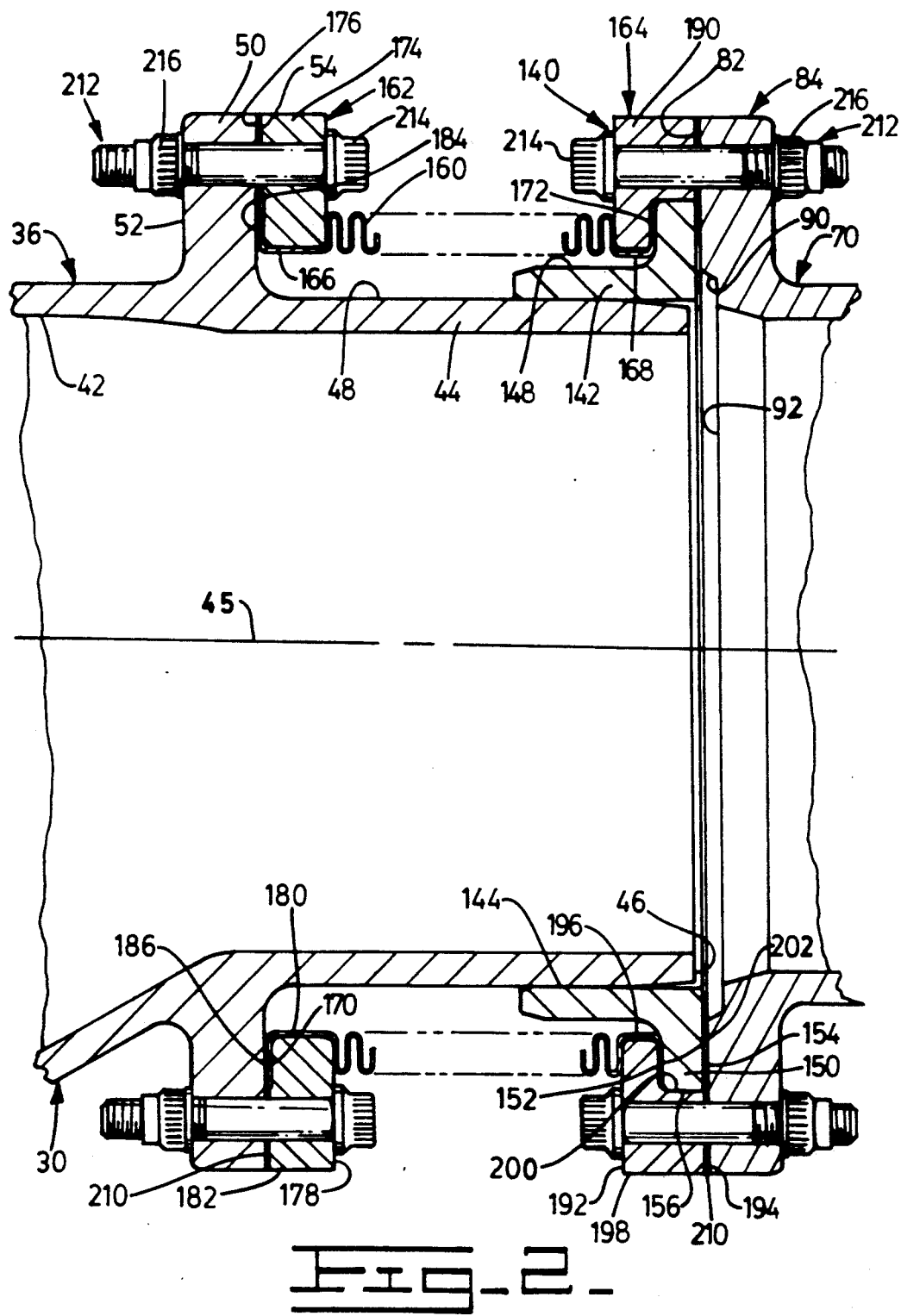

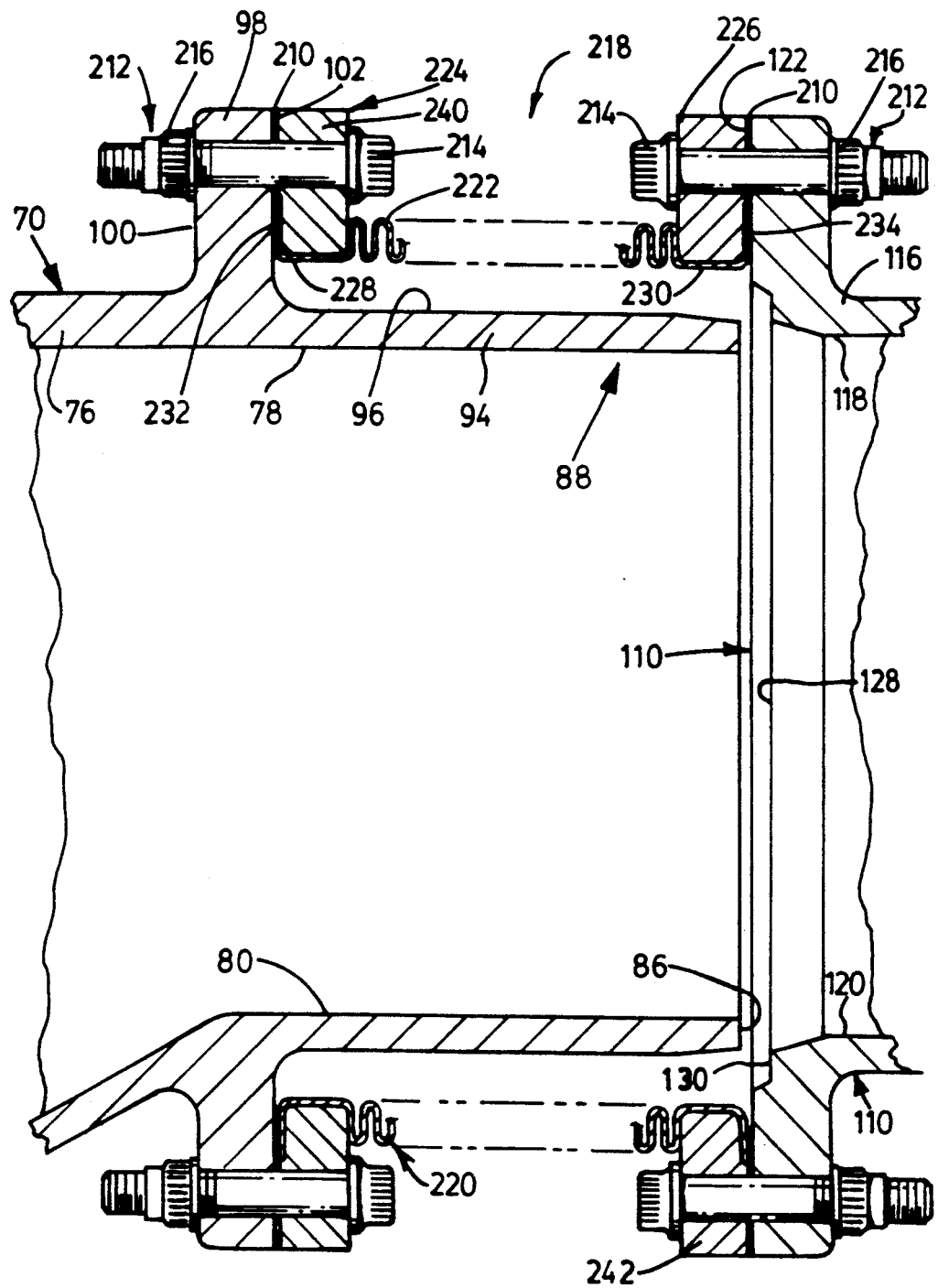
Fig_3_

FLEXIBLE COUPLING DEVICE FOR USE IN AN ENGINE MANIFOLD SYSTEM

TECHNICAL FIELD

This invention relates to a flexible coupling device for an exhaust manifold system of an engine or the like and more particularly to a flexible coupling device for use with a plurality of individual manifold sections that are sealably connected together and individually removable without disturbing the adjacent sections.

BACKGROUND ART

Exhaust manifold systems of internal combustion engines are subjected to extremely high and variable temperatures during operation causing expansion and contraction of the manifold components. It has been the practice, particularly on large engines, to make the manifolds in multiple sections and to interconnect the sections by sliding couplings and/or flexible bellows, thus reducing the possibility of damage which results from expansion and contraction. Sliding couplings without seals have a tendency to allow exhaust gas leakage. Flexible bellows provide a positive seal and compensate for expansion, but the known methods employed to sealably connect the flexible bellows in place are too difficult to service.

Representative of the art in this area is U.S. Pat. No. 3,490,794, issued Jan. 20, 1970, to M. A. Swanson, which teaches an exhaust manifold joint including a protective tubing slidably fitted within the ends of the manifold sections, and a flexible bellows member removably secured to the manifold sections by annular clamps. The tubing prevents the hot exhaust gasses from acting directly on the flexible bellows, guides the exhaust gasses through the manifold system and axially aligns the sections. Since the tubing is slidably fitted within the ends of the manifold sections, the intermediate sections of the manifold cannot be removed for servicing the related cylinder head without first starting at an end section and serially disconnecting the manifold sections. This is time consuming and expensive especially on large engines where each manifold section may weigh 27.24 kilograms (60 lbs.) or more.

U.S. Pat. No. 3,820,829, issued Jun. 28, 1974, to Hasselbacher et al., likewise teaches a liner arranged between the tubular sections and an interconnecting flexible bellows secured by solid locking rings of resilient material at each end thereof. For the most part, these couplings are too difficult to manufacture, assemble, or disassemble.

In some applications, a separate rigid joint is spaced away from the flexible coupling to allow disassembly of the individual manifold sections. This is undesirable because it introduces additional complexity to the manifold casting resulting in increased cost and additional sealing problems.

In certain sections of the manifold pressure waves react on the internal surfaces and cause a pulsing action. If not properly supported, this pulsating action causes the manifold section to vibrate and the attached flexible bellows to continually flex which results in premature metal fatigue.

Therefore, what is desirable is an improved flexible assembly for an exhaust manifold system having an economical flexible coupling device between individual manifold sections that is simple and of rugged construction. Moreover, the flexible coupling device must be sufficiently flexible to accept expansion and contraction within the manifold system while preventing the leakage of the exhaust gas between the individual sections. It is also desirable that the flexible coupling device provide axial alignment and support between the individual sections preventing vibration while permitting an individual manifold section to be removable from its respective cylinder head for service without the need to disassemble adjacent manifold sections. It is also desirable that the hot exhaust gasses pass smoothly through the manifold sections with a minimum amount of turbulence, and that the annular flexible bellows be protected and not be in direct contact with the flowing hot gasses which can drastically effect the service life of the flexible bellows.

The present invention is directed to overcoming one or more of the problems set forth above.

Disclosure of the Invention

In one aspect of the invention, a flexible coupling device is provided for sealingly connecting first and second tubular bodies. The first tubular body includes a first tubular portion having a cylindrical end defining a first tubular portion end face and a flange axially spaced away from the first tubular portion end face. The second tubular body includes a second tubular portion having a planar mounting surface. A guide ring is disposed in telescopic relationship with the cylindrical end of the first tubular portion. First retaining ring means includes a first retaining ring for releasably securing the first attachment end of a flexible bellows between the retaining ring and the flange of the first tubular portion and second retaining ring means includes a second retaining ring for releasably securing a second attachment end of the flexible bellows and the guide ring to the planar mounting surface of the second tubular member.

In another aspect of the invention, an exhaust manifold system is provided for an engine defining first and second cylinder heads, a first manifold section removably secured to the first cylinder head and a second manifold section removably secured to the second cylinder head. The first manifold section includes a first tubular portion having a cylindrical end, a first tubular portion end face and a radially outwardly extending first flange axially spaced away from the first tubular portion end face. The second manifold section includes a second tubular portion having a planar mounting surface at a first end and a second tubular end face at the opposite second end. A support element defines a support element passage substantially columnar with the second tubular portion at the second tubular portion end face. A guide ring having a radially outwardly extending flange is disposed in telescopic relation with the cylindrical end of the first tubular portion. First retaining ring means including a first retaining ring releasably secures the first attachment end of a flexible bellows between the first retaining ring and the first flange of the first tubular portion. Second retaining ring means includes a second retaining ring releasably secures the second attachment end of the flexible bellows and the guide ring to the planar mounting surface of the second tubular portion. Means is also provided for sealably connecting the opposite second end of the second manifold section to the support element.

BRIEF DESCRIPTION OF THE DRAWINGS

FIG. 1 is a diagrammatic elevation view of flexible coupling devices of the present invention and an exhaust manifold system with portions broken open to show details thereof in cross-section;

FIG. 2 is an enlarged portion of FIG. 1 showing one embodiment of a flexible coupling device and associated elements in cross-section about the central axis thereof; and FIG. 3 is an enlarged portion of FIG. 1 showing another embodiment of a flexible coupling device and associated elements in cross-section about the central axis thereof.

BEST MODE FOR CARRYING OUT THE INVENTION

Referring to FIGS. 1 and 2, an exhaust manifold system 10 for an internal combustion engine 12 is shown. The engine 12 is a Cat 3616 diesel engine manufactured by Caterpillar Inc., Peoria Ill. and is of Vee configuration having sixteen cylinders, but it is to be understood that the present invention is equally adaptable to in-line or Vee engines of more than four cylinders. The engine 12 includes a block 14 having a top head mounting surface 16, a first cylinder head 18, a second cylinder head 20, and a third cylinder head 22 removably secured to the top surface.

A first tubular body or first manifold section 30 is removably secured to a side wall 32 of the first cylinder head 18 by a plurality of bolts 34. The first manifold section 30 includes a first tubular portion 36 defining an internal passage 40 having a generally cylindrical internal surface 42, a cylindrical end 44 having a central axis 45 and defining a first tubular portion end face 46, and a outer peripheral surface 48, a radially outwardly extending flange 50 axially spaced from the end face 46 and having a pair of generally parallel side walls 52 and 54, and an end wall 56 opposite the first tubular portion end face 46. The passage 40 communicates with an exhaust port (not shown) in the first cylinder head 18 by a tubular branch portion 58 having an internal passage 60.

As best shown in FIGS. 1, 2 and 3, a second tubular body or second manifold section 70 is removably secured to a sidewall 72 of the second cylinder head 20 by a plurality of bolts 74. The second manifold section 70 includes a second tubular portion 76 defining an elongate open-ended second tubular portion passage 78 having a generally cylindrical internal surface 80 and a planar mounting surface 82 at a first end 84 substantially concentric with the central axis 38, and a second tubular portion end face 86 at an opposite second end 88. A recess 90 having an end wall 92 and a preselected depth is formed in the planar mounting surface 82 and in concentric relation with the elongate second tubular portion passage 78. The recess 90 defines a diameter greater than the outer peripheral surface 48 of the first tubular portion 36 of the first manifold 30. The opposite second end 88 further includes a cylindrical end 94 having an outer peripheral surface 96 and a radially outwardly extending flange 98 axially spaced from the second tubular portion end face 86. The flange 98 has a pair of generally parallel side walls 100 and 102. The second tubular portion passage 78 communicates with an exhaust port (not shown) in the second cylinder head 20 by an integral generally tubular branch portion 104 having an internal passage 106.

A support element or third manifold section 110 is removably secured to a sidewall 112 of the third cylinder head 22 by a plurality of bolts 114. In this specific instance the third manifold section 110 is identical in construction to the second manifold section 70. The third manifold section 110 includes a third tubular portion 116 defining an elongate third tubular portion or support element passage 118 having a generally cylindrical internal surface 120 that is substantially coaxial with the second tubular portion passage 78 of the second tubular portion 76 of the second manifold section 70, a planar mounting surface 122 at a first end 124 and an opposite second end 126. A recess 128 having an end wall 130 and a preselected depth is formed in the planar mounting surface 122. The passage 118 communicates with an exhaust port (not shown) in the third cylinder head 22 by a tubular branch portion 132 having an internal passage 134.

The axial distance between the first tubular postion end face 46 of the first manifold section 30 and the planar mounting surface 122 of the third manifold section 110 is greater than the axial distance between the planar mounting surface 82 of the second manifold section 70 and the opposite second tubular portion end face 86 thereof to permit easy servicing thereof as well be subsequently explained.

The first, second, and third manifold sections 30, 70 and 110 are castings preferably made of metallic material such as ductile iron or any other suitable material.

As best shown in FIG. 2, a first flexible coupling device 140 sealingly connects the first and second manifold sections 30 and 70. The first flexible coupling device 140 includes a guide ring 142 having an inner surface 144, an outer peripheral surface 148 and a radially outwardly extending flange 150. The flange 150 has a pair of generally parallel side walls 152 and 154 defining a predetermined width and an outer peripheral surface 156. The guide ring 142 is disposed in relative close telescopic relationship with the cylindrical end 44 of the first tubular portion 36. The inner surface 144 of the guide ring 142, in this specific instance, has a slip clearance of approximately 0.30 mm (0.012 inch) with the outer peripheral surface 48 of the cylindrical end 44.

The first flexible coupling device 140 further includes a formed flexible bellows 160, first retaining ring means 162, and second retaining ring means 164. The flexible bellows 160 is preferably manufactured from 2-ply stainless steel with each ply having a material thickness of approximately 0.30 mm (0.012 in.). The flexible bellows 160 includes a first attachment end 166 and a second attachment end 168. The first attachment end 166 includes a radially outwardly extending first lip 170 and the second attachment end 168 includes a radially outwardly extending second lip 172.

The first retaining ring means 162 includes a first retaining ring 174 having a pair of generally parallel side walls 176 and 178, an inner surface 180, and outer surface 182. The first retaining ring 174 releasably secures the first attachment end 166 of the flexible bellows 160 between the first retaining ring and the first flange 50 of the first tubular portion 36. A recess 184 having an end wall 186 is formed in the side wall 176 of the first retaining ring 174 and in concentric relationship with the inner surface 180. The first lip 170 is received in the recess 184 with the depth of the recess being less than the material thickness of the flexible bellows 160. In this specific instance the depth of the recess 184 is equal to approximately two-thirds the material thickness of the flexible bellows 160.

The second retaining ring means 164 includes a second retaining ring 190 having a pair of generally parallel side walls 192 and 194, an inner surface 196 and an outer surface 198. The second retaining ring 190 releasably secures the second attachment end 168 of the flexible bellows 160 and the guide ring 142 to the planar mounting surface 82 of the second tubular portion 76. A recess 200 having an end wall 202 is formed in the side wall 194 of the second retaining ring 190 and in concentric relationship with the inner surface 196. The second lip 172 is received in the recess 200 and the outer peripheral surface 156 of the guide ring 142 is preferably pressfitted into the recess. Alternatively, the outer peripheral surface 156 may have the same or slightly smaller diameter as the recess 200. The depth of the recess 200 is less than the combined material thickness of the flexible bellows 160 and the flange 150 of the guide ring 142.

The first flexible coupling device 140 further includes a pair of compressible gaskets 210 one of which is disposed between the radially outwardly extending flange 50 of the first tubular portion 36 and the first retaining ring 174 and the first lip 170 of the first attachment end 166. The other gasket 210 is disposed between the planar mounting surface 82 of the second tubular portion 76 and the second retaining ring 190 and the radially outwardly extending flange 150 of the guide ring 142. The first retaining ring 174 is releasably secured to the first flange 50 and the second retaining ring 190 and the second retaining ring is releasably secured to the planar mounting surface 82 by fastening means 212. The fastening means in this specific instance include a plurality of bolts 214 and nuts 216.

As best shown in FIG. 3, means 218 sealingly connects the opposite second end 88 of the second manifold section 70 to the support element or third manifold 110. The means 218 include a second flexible coupling device 220. The second flexible coupling device 220 includes a formed flexible bellows 222, third retaining means 224, and fourth retaining means 226. The flexible bellows 222 includes a first attachment end 228 and a second attachment end 230. The first attachment end 228 includes a radially outwardly extending first lip 232 and the second attachment end 228 includes a radially outwardly extending second lip 234. The flexible bellows 222 is preferably manufactured from 2-ply stainless steel with each ply having a material thickness of approximately 0.30 mm (0.012 in.).

The third retaining means 224 includes a third retaining ring 240 and the fourth retaining means 226 includes a fourth retaining ring 242. The third and fourth rings 240 and 242 are identical in construction to the first retaining ring 174 and therefore will not be described in detail. It is appreciated that, in use, the fourth retaining ring 242 is reversed as shown in FIG. 3. The first lip 232 of the first attachment end 228 is received in the recess of the third retaining ring 240 and the second lip 234 of the second attachment end 230 is received in the recess of the fourth retaining rings 242. The third retaining ring 240 releasably secures the first attachment end 228 of the flexible bellows 222 between the third retaining ring and the flange 98 of the second tubular portion 76. The fourth retaining ring 242 releasably secures the second attachment end 230 of the flexible bellows 222 between the fourth retaining ring and the planar mounting surface 122 of the third tubular portion 116.

The first, second, third and fourth retaining rings 174, 190, 240 and 242 and guide ring 142 are castings preferably made of metallic material such as ductile iron or any other suitable material.

The second flexible coupling device 220 further includes the pair of gaskets 210. One of gaskets 210 is disposed between the radially outwardly extending flange 98 of the second tubular portion 76 and the third retaining ring 240 and the first lip 232 of the first attachment end 228. The other gasket 210 is disposed between the planar mounting surface 122 of the third tubular portion 116 and the fourth retaining ring 242 and the second lip 234 of the second attachment end 230. The third retaining ring 240 is releasably secured to the flange 98 and the fourth retaining ring 242 is releasably secured to the planar mounting surface 122 by the fastening means 212.

A third flexible coupling device 250 sealingly connects the third manifold section 110 to an aligned fourth manifold section 260 a portion of which is shown. The third flexible coupling device 250 is identical in construction to the second flexible coupling device 220.

INDUSTRIAL APPLICABILITY

In operation the exhaust gasses subject the metallic exhaust manifold system to pulsing pressures causing vibration and to extremely high and variable temperatures causing expansion and contraction of the elements of the system. The flexible coupling devices 140 and 220 provide a positive seal between the manifold sections 30, 70, and 110 and allow for expansion and contraction.

The cylindrical end 44 of the first tubular portion 36 has a close slip clearance in the guide ring 142 permitting relative axial expansion and retraction of the first and second manifold sections 30 and 70. Advantageously, the guide ring 142 is so constructed and arranged as to provide axial alignment and support of the cylindrical end 44 of the first tubular portion 36 of the first manifold section 30 preventing pressure waves that act on end wall 56 from vibrating the first manifold section. Premature metal fatigue of the flexible bellows 160 is thus prevented since the coupling device 140 is not continually flexed.

In operation the cylindrical ends 44 and 94 of the first and second manifold sections 30 and 70 serves to protect the flexible bellows 160 and 222 from the hot exhaust gases. As a result of thermal expansion the cylindrical end 44 of the first tubular portion 36 expands into the recess 90 of the planar mounting surface 82 substantially closing the gap between the first tubular portion end face 46 and the end wall 92 of the recess. Likewise, the cylindrical end 94 of the second tubular portion thermally expands into the recess 128 of the planar mounting surface 122 substantially closing the gap between the second tubular portion end face 86 and the end wall 130 of the recess 122. This results in the first tubular portion passage 40, the second tubular portion passage 78, and the third tubular portion passage 118 forms substantially one continuous, relatively smooth passage for relative smooth flow of the exhaust gasses with a minimum amount of turbulence.

The relatively close slip clearance between the inner surface 144 of the guide ring 142 and the outer peripheral surface 48 of the cylindrical end 44, also serves to protect the flexible bellows 160 from the hot burining gasses.

The relative movement between the guide ring 142 and the cylindrical end 44 prevents a build-up of carbon deposits from forming between the cylindrical end and the guide ring.

With the depth of the recess 184 in the first retaining ring 174 being less than the material thickness of the lip 170 of the bellows 160 insures that the lip 170 and the gasket 210 are sealingly compressed between the first ring 174 and the flange 50 to prevent the leakage of exhaust gas. Likewise, with the depth of the recess 200 in the second retaining ring 190 being less than the combined material thickness of the lip 172 of the bellows 160 insures that the lip 172 is sealingly compressed between the end wall 202 of recess 200 and the flange 150 of the guide ring 142 and that the gasket 210 is sealingly compressed between the flange 150 and the planar mounting surface 82.

Removing the fastening means 212 that releasably secures the second retaining ring 172 to the planar mounting surface 122 disconnects the first flexible coupling device 140 and the guide ring 142 from the second manifold section 70. Removing the fastening means 212 that releasably secures the fourth retaining ring 242 to the planar mounting surface 122 disconnects the second flexible coupling 220 from the third manifold section 110. The second manifold section 70 can then be easily and simply removed for servicing the cylinder head 20 without first starting at the first manifold section 30 since there are no interposed parts. This is possible because with the second manifold 70 at ambient temperature, the axial distance between the first tubular portion end face 46 of the first manifold section 30 and the planar mounting surface 122 of the third manifold section 110 is greater than the axial distance between the planar mounting surface 82 of the second manifold section 70 and the opposite second tubular portion end face 86.

Other aspects, objects, and advantages can be obtained from a study of the drawings, the disclosure and the appended claims.

We claim:

1. A flexible coupling device for sealingly connecting first and second tubular bodies, the first tubular body including a first tubular portion having a central axis, a cylindrical end defining a first tubular portion end face, and a radially outwardly extending flange axially spaced from the first tubular portion end face, the second tubular body including a second tubular portion having a planar mounting surface substantially concentric with the central axis; the flexible coupling device comprising:
   a guide ring having a radially outwardly extending flange and disposed in telescopic relation with the cylindrical end of the first tubular portion;
   a flexible bellows having a first attachment end and a second attachment end;
   first retaining ring means including a first retaining ring for releasably securing the first attachment end of the flexible bellows between the first retaining ring and the flange of the first tubular portion; and
   second retaining ring means including a second retaining ring for releasably securing the second attachment end of the flexible bellows and the guide ring to the planar mounting surface of the second tubular member, the second retaining ring includes a recess and the flange of the guide ring has an outer peripheral surface pressfitted in the recess, and the guide ring being so constructed and arranged as to provide axial alignment and support of the cylindrical end of the first tubular portion.

2. The flexible coupling device of claim 1 wherein the recess has an end wall and the second attachment end of the flexible bellows has a lip disposed between the end wall and the flange of the guide ring.

3. The flexible coupling device of claim 2 wherein the flexible bellows has a preselected thickness, the flange of the guide ring has a preselected thickness with the depth of the recess in the second retaining ring being less than the combined thickness of the flexible bellows and the flange.

4. The flexible coupling device of claim 1 wherein the first tubular body is a first manifold section removably connected to a first cylinder head of an engine and the second body is a second manifold section removably connected to a second cylinder head of the engine.

5. A flexible coupling device for sealingly connecting first and second tubular bodies, the first tubular body including a first tubular portion having a central axis, a cylindrical end defining a first tubular portion end face, and a radially outwardly extending flange axially spaced from the first tubular portion end face, the second tubular body including a second tubular portion having a planar mounting surface substantially concentric with the central axis; the flexible coupling device comprising:
   a guide ring having a radially outwardly extending flange of a predetermined thickness and disposed in telescopic relation with the cylindrical end of the first tubular portion;
   a flexible bellows having a predetermined thickness, a first attachment end, and a second attachment end;
   first retaining ring means including a first retaining ring for releasably securing the first attachment end of the flexible bellows between the first retaining ring and the flange of the first tubular portion; and
   second retaining ring means including a second retaining ring for releasably securing the second attachment end of the flexible bellows and the guide ring to the planar mounting surface of the second tubular member, the second retaining ring includes a recess and the flange of the guide ring is disposed in the recess, the recess having an end wall and the second attachment end of the flexible bellows has a lip disposed between the end wall and the flange of the guide ring, with the depth of the recess in the second retaining ring being less than the combined thickness of the flexible bellows and the flange, and the guide ring being so constructed and arranged as to provide axial alignment and support of the cylindrical end of the first tubular portion.

6. A flexible coupling for sealingly connecting first and second tubular bodies, the first tubular body including a first tubular portion having a central axis, a cylindrical end defining a first tubular portion end face, and a radially outwardly extending flange axially spaced from the first tubular portion end face, the second tubular body including a second tubular portion having a planar mounting surface substantially concentric with the central axis; the flexible coupling device comprising:
   a guide ring having a radially outwardly extending flange and disposed in telescopic relation with the cylindrical end of the first tubular portion;
   a flexible bellows having a first attachment end and a second attachment end;

first retaining ring means including a first retaining ring for releasably securing the first attachment end of the flexible bellows between the first retaining ring and the flange of the first tubular portion;

second retaining ring means including a second retaining ring for releasably securing the second attachment end of the flexible bellows and the guide ring to the planar mounting surface of the second tubular member, the guide ring being so constructed and arranged as to provide axial alignment and support of the cylindrical end of the first tubular portion; and a pair of gaskets, one being disposed between the radial outwardly extending flange of the first tubular portion and the first retaining ring and the first attachment end and the other being disposed between the planar mounting surface of the second tubular portion and the second retaining ring and the flange of the guide ring.

7. The flexible coupling device of claim 6 wherein the first attachment end of the flexible bellows has a preestablished thickness and the first retaining ring includes a recess having a depth, the depth being less than the thickness of the first attaching end.

8. The flexible coupling device of claim 7 including fastening means for releasably securing the first retaining ring to the radially outwardly extending first flange of the first tubular portion and the second retaining ring to the planar mounting surface.

9. The flexible coupling device of claim 8 wherein the fastening means include a plurality of bolts and nuts.

10. An exhaust manifold system for an engine defining first and second cylinder heads, a first manifold section removably secured to the first head and including a first tubular portion, a cylindrical end having a central axis and defining a first tubular portion end face, and a radially outwardly extending first flange axially spaced from the first tubular portion end face, a second manifold section removably secured to the second head and including a second tubular portion defining a second tubular portion passage, the second tubular portion having a planar mounting surface at a first end substantially concentric with the central axis and a second tubular portion end face at an opposite second end, and a support element defining a support element passage substantially coaxial with the second tubular portion passage of the second tubular portion at the second tubular portion end face, and a planar mounting surface, the axial distance between the first tubular portion end face of the first manifold section and the planar mounting surface of the support element being greater than the axial distance between the planar mounting surface of the second manifold section and the opposite second tubular portion end face thereof, the exhaust manifold system comprising:

a guide ring having a radially outwardly extending flange and disposed in telescopic relation with the cylindrical end of the first tubular portion;

a flexible bellows having a first attachment end and a second attachment end;

first retaining ring means including a first retaining ring for releasably securing the first attachment end of the flexible bellows between the first retaining ring and the first flange of the first tubular portion;

second retaining ring means including a second retaining ring for releasably securing the second attachment end of the flexible bellows and the guide ring to the planar mounting surface of the second tubular portion with the guide ring being so constructed and arranged as to provide axial alignment and support of the cylindrical end of the first tubular portion;

a pair of gaskets, one being disposed between the radial outwardly extending flange of the first tubular portion and the first retaining ring and the first attachment end and the other being disposed between the planar mounting surface of the second tubular portion and the second retaining ring and the flange of the guide ring; and means for sealingly connecting the opposite second end of the second manifold section to the support element.

11. The exhaust manifold system of claim 10 wherein the opposite second end of the second tubular portion further includes a cylindrical end and a flange axially spaced from the end face.

12. The exhaust manifold system of claim 11 wherein the means for sealingly connecting the opposite second end of the second tubular portion to the support element includes a flexible coupling device, the flexible coupling device includes another flexible bellows having a first attachment end and a second attachment end;

third retaining ring means including a third retaining ring for releasably securing the first attachment end of the another flexible bellows between the third retaining ring and the flange of the second tubular portion;

fourth retaining ring means including a fourth retaining ring for releasably securing the second attachment end of the another flexible bellows to the planar mounting surface of the support element.

13. The exhaust manifold system of claim 11 wherein the internal combustion engine defines a third cylinder head, and the support element is a third manifold section removably secured to the third cylinder head.

14. The exhaust manifold system of claim 10 wherein the first attachment end of the flexible bellows has a preestablished thickness and the first retaining ring includes a recess having a depth, the depth being less than the thickness of the first attachment end.

15. The exhaust manifold system of claim 10 including fastening means for releasably securing the first retaining ring to the radially outwardly extending first flange of the first tubular portion and the second retaining ring to the planar mounting surface.

16. The exhaust manifold system of claim 15 wherein the fastening means include a plurality of bolts and nuts.

17. The exhaust manifold system of claim 10 wherein the second retaining ring includes a recess and the flange of the guide ring has an outer peripheral surface pressfitted in the recess.

18. The exhaust manifold system of claim 17 wherein the recess has an end wall and the second attachment end of the flexible bellows has a lip disposed between the end wall and the flange of the guide ring.

19. The exhaust manifold system of claim 18 wherein the flexible bellows has a preselected thickness, the flange of the guide ring has a preselected thickness with the depth of the recess in the second retaining ring being less than the combined material thickness of the flexible bellows and the flange.

* * * * *